United States Patent
Powell

(10) Patent No.: US 9,981,811 B2
(45) Date of Patent: May 29, 2018

(54) ITEM MOVEMENT APPARATUS

(71) Applicant: Positive Automation Ltd, St Neots, Cambridgeshire (GB)

(72) Inventor: Colin Powell, St Neots (GB)

(73) Assignee: Positive Automation Ltd., St. Neots, Cambridgeshire (GB)

( * ) Notice: Subject to any disclaimer, the term of this patent is extended or adjusted under 35 U.S.C. 154(b) by 166 days.

(21) Appl. No.: 15/088,730

(22) Filed: Apr. 1, 2016

(65) Prior Publication Data
US 2017/0283192 A1   Oct. 5, 2017

(51) Int. Cl.
*B65G 67/04* (2006.01)
*B65G 1/10* (2006.01)

(52) U.S. Cl.
CPC ............... *B65G 67/04* (2013.01); *B65G 1/10* (2013.01)

(58) Field of Classification Search
CPC .................................. B65G 67/04; B65G 1/10
USPC ............ 414/331.01, 331.06, 331.07, 331.08, 414/331.09, 331.1, 331.11
See application file for complete search history.

(56) References Cited

U.S. PATENT DOCUMENTS

| | | | | |
|---|---|---|---|---|
| 1,196,700 A * | 8/1916 | King | | 198/620 |
| 3,157,301 A | 11/1964 | McWilliams | | |
| 3,432,045 A * | 3/1969 | Bauer | | B65G 57/005 414/280 |
| 3,637,095 A * | 1/1972 | Kampfer | | B65G 65/00 414/331.07 |
| 4,379,671 A * | 4/1983 | Cochran | | B65G 65/00 198/571 |
| 4,621,969 A * | 11/1986 | Berghall | | B65G 65/00 414/331.07 |
| 4,634,333 A * | 1/1987 | Butterly, Jr. | | B65G 65/00 187/251 |
| 4,787,799 A | 11/1988 | Platteschorre | | |
| 5,106,259 A * | 4/1992 | Anderson | | B65G 65/00 414/273 |
| 5,244,330 A * | 9/1993 | Tonjes | | B65G 65/00 198/432 |
| 5,310,300 A * | 5/1994 | Crabb | | B65G 65/00 198/408 |
| 6,036,424 A * | 3/2000 | Santangelo | | B65G 47/519 414/152 |
| 6,579,053 B1 | 6/2003 | Grams et al. | | |

FOREIGN PATENT DOCUMENTS

| | | |
|---|---|---|
| EP | 0550919 | 7/1993 |
| GB | 1167325 | 10/1969 |

* cited by examiner

*Primary Examiner* — Kaitlin S Joerger
(74) *Attorney, Agent, or Firm* — Head, Johnson, Kachigian & Wilkinson, PC

(57) ABSTRACT

The invention relates to apparatus and a method for the loading of trolley shelves with containers and particularly, although not exclusively, to the loading of trolleys which are known as cage trolleys and which can carry containers which are provided to be removed directly therefrom and purchased, such as containers of milk. The apparatus and method allows loading of groups of containers onto the respective trolley shelves to be performed while the trolleys are retained at a fixed location with respect to the loading apparatus.

16 Claims, 3 Drawing Sheets

ITEM MOVEMENT APPARATUS

BACKGROUND OF THE INVENTION

1. Field of the Invention

The invention to which this application relates is apparatus for use in the movement of articles and, in particular, although not necessarily exclusively, the movement of articles onto shelves of a trolley in which the articles are grouped and subsequently moved.

2. Prior Art

The movement of articles, such as for example, containers carrying a liquid such as milk, into a trolley or cage for subsequent movement and purchase of the articles therefrom, is well known. The trolley typically includes a base on which are provided a number of castors or wheels which allow the trolley to be moved around. Side walls depend upwardly from the base and a rear wall is also provided. A front portion is formed from one or more door portion which can be moved between open and closed positions. The trolley includes a number of vertically spaced apart shelves on which the articles can be placed. The trolleys, when loaded are typically used to transport the articles from the point of loading, through road transport to the retail outlet at which the articles can be removed from the trolley and purchased.

Typically the spacing between the trolley walls and between the shelves is relatively close to the available space required for the storage of the articles in order to allow the articles to be contained and maintained in position during transport with very limited of the containers being possible. However this also means that in the loading of the trolleys there is very little tolerance or space available for maneuvering of the containers into position and/or no or very limited space for loading apparatus to be located within the trolley during a loading process.

As a result of this it is conventionally the case that the containers are loaded into the trolleys by hand which is time consuming and relatively expensive in terms of labor costs. It can also lead to health worries and injury to the personnel due to the relatively heavy weight of the containers when full.

It has been known to use automated apparatus to load the containers but the known apparatus tends to be relatively bulky, expensive and requires the movement of the trolley as well as the containers during the loading process.

The aim of the present invention is to provide apparatus for use in the movement of a number of containers into a trolley and to allow the same to be done in an efficient manner.

SUMMARY OF THE INVENTION

In a first aspect of the invention there is provided apparatus for the loading of a plurality of containers into a trolley comprising a base, side walls, a rear wall and a front access opening and a plurality of vertically spaced shelves onto which the containers are placed, wherein said apparatus includes a collating means at which one or a group of said containers required to be moved onto a specific shelf of the trolley are located, and movement means for moving the said one or group of containers from the collating means to the height of the said specific shelf and then onto the said shelf with the trolley remaining in a fixed position with respect to the movement means during the loading of the containers onto the said shelves.

In one embodiment the movement means include a robotic arm.

In on embodiment the trolley remains in a fixed position with respect to the movement means during the loading of the containers onto the specific shelf thereof.

In one embodiment means are provided to engage with one of the shelves and/or side walls of the trolley in order to increase the size of at least the opening though which the said group of containers are moved.

Typically the containers are moved through a former or shoe prior to passing into the opening into the trolley.

In one embodiment the former or shoe is provided of a size such that the aperture defined in the same is the same or close to the dimensions of the opening in the trolley through which the group of containers are to be subsequently moved to be located on the shelf.

In one embodiment the means to increase the size of the opening contact with the trolley in advance of the movement of the articles onto the shelf trolley.

In one embodiment the shelves are formed to be moveable between a load taking position and a storage position. Typically the shelf is substantially perpendicular to the side walls of the trolley when in the load taking position. In one embodiment the shelf is formed of two pivotally movable portions.

In one embodiment the means to increase the size of the opening contact with the shelf which is positioned above the shelf onto which the articles are to be loaded and act to increase the height of the opening, possibly by moving the shelf from the load taking position towards the storage position in order to raise the height of the same.

In one embodiment in addition, or alternatively, means are provided to contact the side walls of the trolley to move the same outwardly to increase the size of the opening and thereby aid the movement of the articles in to the trolley.

In one embodiment the apparatus includes means to locate the trolley with respect to the apparatus and maintain the trolley in the fixed position during the loading of the same.

Typically the loading of the trolley commences from the lowest shelf and the trolley is then progressively loaded upwardly.

In one embodiment the surface on which the containers are collated as a group is movable by the movement means in a vertical plane with respect to the trolley, to bring the articles to the required height for the shelf which is to be loaded.

In one embodiment the apparatus is provided as part of apparatus for filling the containers with liquid and moving the same to a retail outlet. In one embodiment the containers are containers for milk and included a handle portion.

In one embodiment the handle portions of the containers are positioned to face the opening into the trolley once loaded to thereby allow the same to be gripped by a customer to remove the container from the trolley for purchase.

In a further aspect of the invention there is provided apparatus for the loading of a plurality of containers into a trolley comprising a base, side walls, a rear wall and a front access opening and a plurality of vertically spaced shelves onto which the containers are placed, said apparatus includes a collating means at which a plurality of said containers required for filling a shelf are located on a surface, movement means for moving the said group of containers onto the shelf and wherein a former or shoe is provided intermediate the collating means and the trolley and through which the group of containers for a particular shelf is moved prior to entering the trolley.

In one embodiment the apparatus includes expanding elements which contact with the trolley to temporarily increase the size of the opening whilst a group of containers is being placed therethrough.

In a yet further aspect of the invention there is provided a method of loading a trolley with a plurality of containers, said containers located on shelves of the trolley, said method comprising the steps of moving the trolley to be loaded to a loading position, moving a number of the containers to a collating means to form a group of containers to be loaded onto a specific shelf, wherein the trolley is maintained in a fixed position, and moving the group of containers to the height of the said specific shelf and moving the group of containers onto the shelf.

In one embodiment the containers in the group are respectively oriented.

In one embodiment the group of containers are moved through a former or shoe and onto a shelf of the trolley.

In one embodiment elements, hereby referred to as expanding elements, are provided to move the side walls and/or at least one of the shelves of the trolley so as to temporarily increase the dimension of the opening into the trolley through which the containers are passed onto the specific shelf.

Typically the increase in the dimensions of the opening is maintained for the duration of the movement of the containers onto the shelf.

BRIEF DESCRIPTION OF THE DRAWINGS

Specific embodiments of the invention are now described with reference to the accompanying drawings wherein.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
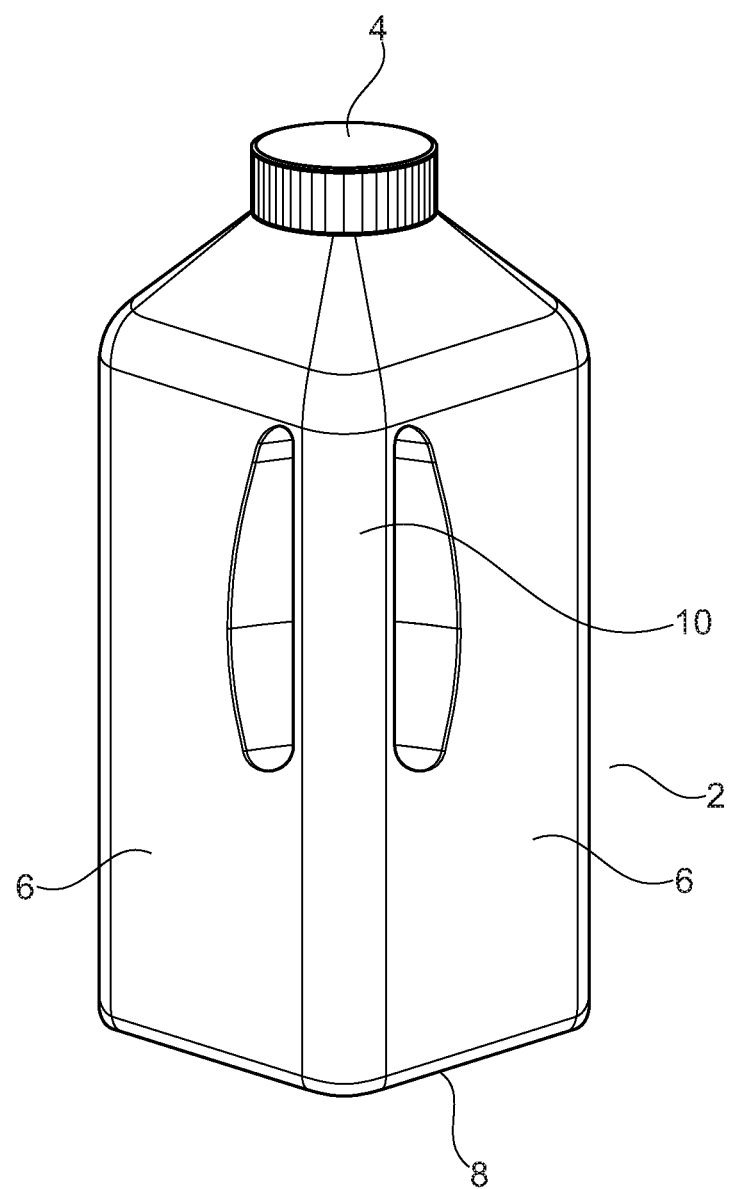
FIG. 1 illustrates an embodiment of a container of a form with which the apparatus of the invention can be used.
Figure 2:
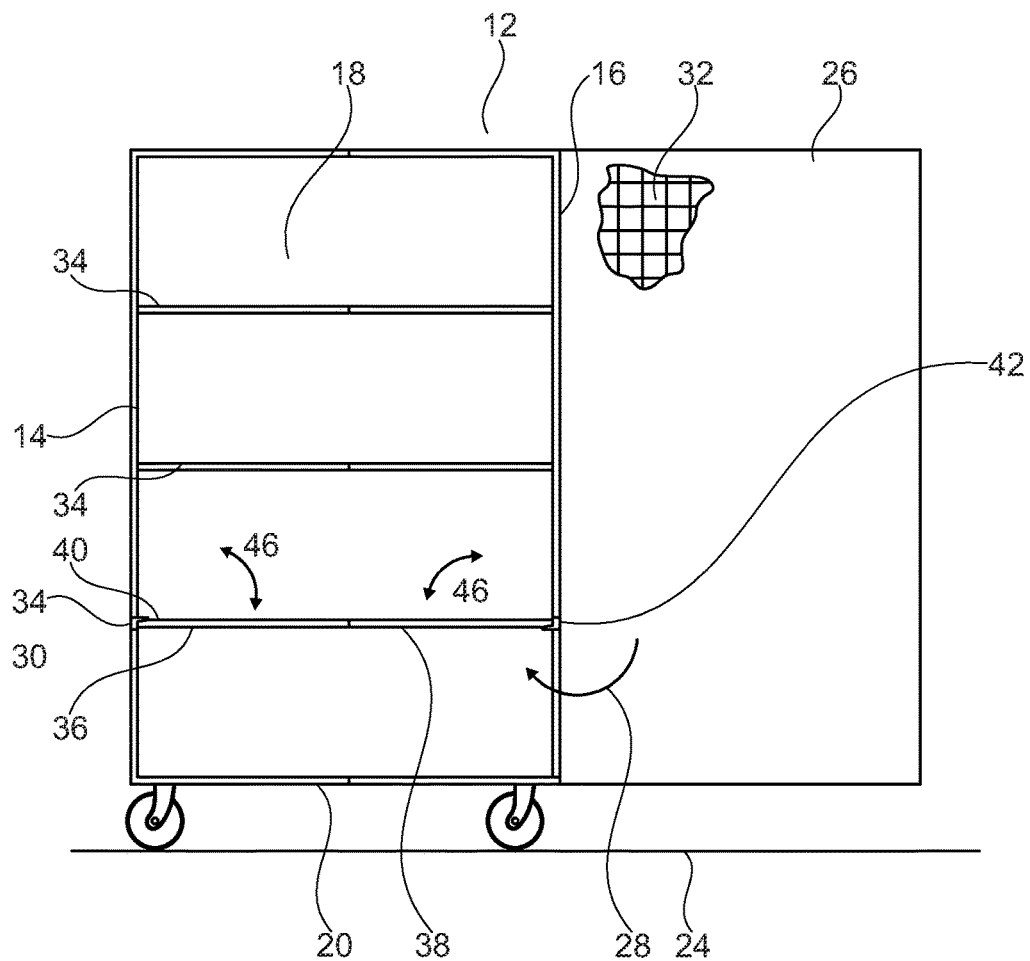
FIG. 2 illustrates a trolley or cage in one embodiment for the receipt of the containers.

Referring firstly to FIG. 1 there is illustrated a container 2 in one embodiment and of a type with which the apparatus in accordance with the invention can be used to load the same on to a trolley of the type shown in FIG. 2. The container has a cap 4, side walls 6 and a base 8. There can also, as in this embodiment, be provided a handle portion 10.

The trolley 12 is provided with side walls 14, 16 and a rear wall 18 connected to a base 20 on which a plurality of wheels 22 are provided to allow the trolley to be moved along a surface 24. A door 26 is provided which is shown in an open position but can be moved as indicated by arrow 28 about hinge on the side wall 16 to a closed position in which the opening 30 into the trolley is closed and the containers secured therein. The walls and door are typically made from a wire mesh material, a portion 32 of which is shown in the door 26. A series of shelves 34 are provided and the base 20 also acts as a shelf. The shelves 34 are typically formed from two portions 36, 38 which are hingedly movable about respective hinges 40, 42 as indicated by arrows 44,46 between the load carrying position shown and a storage position in which the same lies substantially in line with the side walls 14,16.

Figure 3:
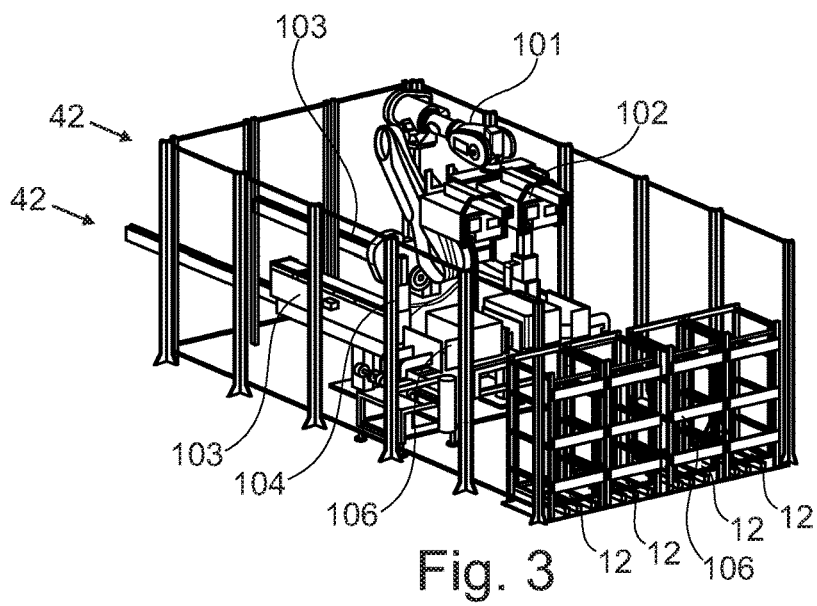
FIG. 3 illustrates apparatus in accordance with a preferred embodiment of the invention.

Referring to FIG. 3 there is provided apparatus in accordance with one embodiment of the invention. The apparatus includes six units as shown, and which include a lift and rotating unit 101 which can be an industrial robot or a linear mechanism. The robot typically has 6 axes of movement. If the linear mechanism is used there are X and Y axes of movement with servo drive control to provide the required speed and accuracy of movement.

The loading head 102 allows the collated group of containers to be moved from the collation unit 105 onto a specific shelf of the trolley. The infeed conveyor 103 is typically a mechanical conveyor, most typically a belt conveyor, such as slat or flat-top, and can be multi lane depending on the operating speed required and is located with an inserter 104 which provides a linear movement to insert the containers into the loading head 102. The inserter is a linear device that inserts the collated containers into the loading head. The inserter can be either invertor or servo controlled depending on the operating speed required.

The collation unit 105 provides a linear movement that collates the containers into the required grouping.

The trolley locater 106 positions and clamps the trolleys at the respective required location with respect to the apparatus. The trolley locator locates and clamps the trolleys 12 to a datum point, the locator can typically consist of one or more stations, in this case four, depending on the required operation speed.

Figure 4:
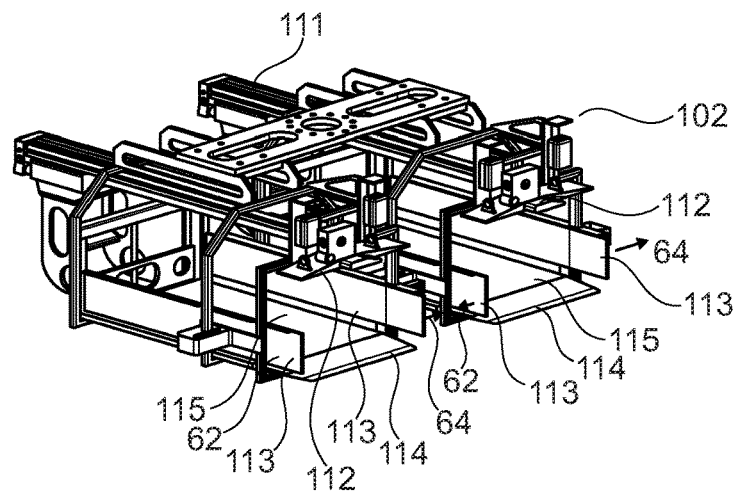
FIG. 4 illustrates a loading head for use with the apparatus of FIG. 5.
Figure 5:
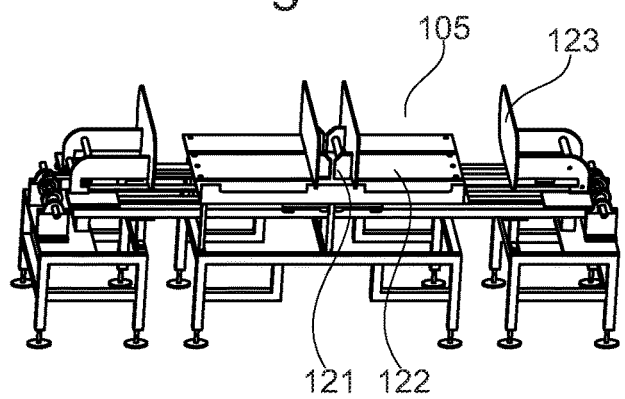
FIG. 5 illustrates a collation unit for use with the apparatus of FIGS. 3 and 4.

An embodiment of the loading head 102 is shown in FIG. 4 The loading head consists of four elements and, dependent on the speed required, either a single or double head can be provided, with a double head shown in FIG. 5.

The container transfer element 111 is a linear motion device that transfers the container group into the trolleys 12, and this can either be pneumatically or electrically controlled depending on the required speed. The top guide element 112 controls the height at which the container group is moved through into the trolley shelf.

The side clamp element surfaces 113 have three functions, the first of which is to act as a funnel as the containers are inserted into it by the inserter 104. The second function is to contact with the side walls of the trolley which is to be loaded with the containers and apply force to spread the trolley side walls apart to their maximum possible opening width as indicated by arrows 62, 64 prior to transferring the group of containers into the trolley and onto the specific shelf. The third function is for the base locator 114, side walls 113 and top guide element 112 to act as a former or shoe as the container group is transferred into the trolley.

The base locator 114 locates the specific trolley shelf and clamps it to the underside thereby ensuring that the specific trolley shelf is parallel with the surface 115 from which the container group is being transferred.

The collation unit 105 is shown in more detail in FIG. 5 and the longitudinal axis of the same is arranged transversely to the direction of movement of the infeed conveyor, as shown in FIG. 3. The unit 105 consists of three main modules and can be either a single or double system depending on the required operating speed.

A support arm module 121 is a linear motion device that supports the containers are they are indexed onto the collation table module 122. This would typically be servo controlled for speed and accuracy.

At the collation table module 122 the collation of the said group of containers is formed prior to transfer of the containers into the loading head.

The index module 123 is a linear motion device that indexes the preformed rows of containers from the infeed conveyor onto the collation table to make up the collation of the group of products. This would be servo controlled for speed and accuracy.

A method of moving the containers 2 into the trolley shelves 34 is now described with reference to FIGS. 3-5.

The containers are moved by the infeed apparatus 103 such as conveyors, in the direction illustrated by arrows 42 in FIG. 3 to supply the containers, which are typically filled at this stage, such as with milk. The containers enter the collating means 105, two of which are shown in FIG. 3 to allow the loading of four trolleys 12.

At the collating means 105 the containers are grouped and oriented into the required groups of the required number and orientation of containers and configuration to be loaded onto one of the shelves 34. Typically the containers are all provided with the same orientation so that the handle portions 10 all face the opening of the trolley when the containers are placed therein. The group is then moved by the inserter 104 into the loading head 102 in which each of the groups are respectively located, in this case two groups for loading into the same height shelves of first and second of the fixed position trolleys at a time. The sidewalls, base locator 114 and top guide element act, in conjunction, as a shoe or former which defines an aperture which is of a size which matches the size of the opening into the trolley shelf and therefore confines the available space for the containers to be moved onto the shelf and therefore prevents any snagging of the containers on the trolley as they are moved into position.

As the available space for the containers to be moved into is the same or very close to the volume taken up by the group of containers when located on the shelf, extending element means are provided to enable the space at least at the opening of the trolley to be temporarily enlarged ate the location of the shelf onto which the containers are to be moved. This is achieved by provided the side wall expanding elements 113 which advance into the trolley ahead of the containers. The elements 113 contact the side walls of the trolley at and/or above the height of the shelf at which the containers are to be introduced so as to bow the side walls outwardly and increase the available space into the opening.

Expanding elements may also be provided to contact with the shelf 34 above that on which the containers are to be placed to raise the shelf portion upwardly so as to increase the height at least at the centre of the shelf.

The trolleys 12 are held in the required location by locating means fixtures which are located and fixed to a support surface or apparatus adjacent to the trolley 106 during the loading process. The loading head 102 is movable in a number of axes to allow the groups of containers from the collating means to be moved into the specific shelf of the trolleys 12 and are movable vertically under the influence of the Lift and Rotate unit 101, most preferably a robot arm, which allows the surface 115 of the apparatus to be brought into alignment with the specific shelf 34 on the trolley which is to be loaded with the group of containers and the group of containers can then be slid from the surface 115 by pusher plates, onto the shelf to load the same while the trolley is held at a constant position. This is repeated until the trolley is completely loaded, with the loading typically commencing from the lowest shelf which is the base.

Thus, in order to load the trolleys, the present apparatus and method allows the same to be loaded without the need for altering the height of the trolleys with respect to the loading apparatus during the loading process. This therefore greatly reduces the expense of conventional apparatus which requires the trolley position to be adjusted during the loading process with respect to the apparatus.

Whereas, the present invention has been described in relation to the drawings attached hereto, it should be understood that other and further modifications, apart from those shown or suggested herein, may be made within the spirit and scope of this invention.

What is claimed is:

1. Apparatus for the loading of a plurality of containers into a trolley comprising:
   a base, side walls, a rear wall and a front access opening and a plurality of vertically spaced shelves onto which the containers are placed, said apparatus includes a collating means at which a group of said containers required to be moved onto a specific shelf of the trolley are located, and movement means for moving the said group of containers from the collating means to the height of the said specific shelf and then onto the said shelf with the trolley remaining in a fixed position with respect to the movement means during the loading of the containers onto the said shelves wherein expanding elements are provided to engage with one of the shelves and/or side walls of the trolley in order to increase the size of at least the opening through which the said group of containers are moved.

2. Apparatus according to claim 1 wherein the movement means include a robotic arm for the movement of the group of containers and a surface on which the group of containers are located, to bring the height of the said surface to the height of the shelf of the trolley onto which that group of containers are to be moved.

3. Apparatus according to claim 1 wherein the expanding elements contact with the trolley in advance of the movement of the articles onto the shelf.

4. Apparatus according to claim 1 wherein the expanding elements contact with the shelf which is positioned above the shelf onto which the articles are to be loaded and act to raise the height of the shelf which is contacted.

5. Apparatus according to claim 1 wherein the expanding elements contact the side walls of the trolley to move the same outwardly to increase the size of the opening.

6. Apparatus according to claim 1 wherein the group of containers are moved through a former or shoe prior to passing into the opening into the trolley.

7. Apparatus according to claim 6 wherein the former or shoe defines an aperture which is of substantially the same dimensions as the opening in the trolley through which the containers are to be subsequently moved to be located on the shelf.

8. Apparatus according to claim 1 wherein the apparatus includes locating means fixtures to locate and maintain the trolley in position with respect to the movement means during the loading of the trolley.

9. Apparatus according to claim 1 wherein the loading of the trolley commences from the lowest shelf and the shelves of the trolley are then sequentially loaded upwardly.

10. Apparatus according to claim 1 wherein the surface on which the containers are collated is movable in a vertical plane with respect to the trolley, to bring the articles to the required height for the shelf which is to be loaded.

11. Apparatus according to claim 1 wherein the containers include a handle portion and the containers are positioned at the collating means such that the handle portion of the respective containers are positioned to face the opening into the trolley once loaded onto the respective shelves.

12. Apparatus for the loading of a plurality of containers into a trolley comprising:
a base, side walls, a rear wall and a front access opening and a plurality of vertically spaced shelves onto which the containers are placed, said apparatus includes a collating means at which a plurality of said containers required for filling a shelf are located on a surface, movement means for moving the said group of containers onto the shelf and wherein a former or shoe is provided intermediate the collating means and the trolley and through which the group of containers for a particular shelf is moved prior to entering the trolley and wherein the apparatus includes expanding elements which contact with the trolley to temporarily increase the size of the opening while a group of containers is being placed therethrough.

13. A method of loading a trolley with a plurality of containers, said containers located on shelves of the trolley, said method comprising the steps of:
moving the trolley to be loaded to a loading position, moving a number of the containers to a collating means to form a group of containers to be loaded onto a specific shelf, wherein the trolley is maintained in a fixed position, and moving the group of containers to the height of the said specific shelf and moving the group of containers onto the shelf and wherein expanding elements are engaged with the side walls and/or at least one of the shelves of the trolley so as to temporarily increase the dimension of the opening into the trolley while the containers are passed through the opening and onto the specific shelf.

14. A method according to claim 13 wherein the containers in the group are respectively oriented.

15. A method according to claim 13 wherein the group of containers are moved through a former or shoe prior to movement onto a shelf of the trolley.

16. A method according to claim 13 wherein the increase in the dimensions of the opening is maintained for the duration of the movement of the containers onto the shelf.

* * * * *